(12) United States Patent
Amoretti

(10) Patent No.: US 12,440,077 B2
(45) Date of Patent: Oct. 14, 2025

(54) ANTI-BACTERIAL CLEANING MACHINE WITH WET FILTER

(71) Applicant: TPA IMPEX S.P.A., Romano d'Ezzelino (IT)

(72) Inventor: Luigi Amoretti, Mussolente (IT)

(73) Assignee: TPA IMPEX S.P.A., Romano d'Ezzelino (IT)

( * ) Notice: Subject to any disclaimer, the term of this patent is extended or adjusted under 35 U.S.C. 154(b) by 501 days.

(21) Appl. No.: 17/765,913

(22) PCT Filed: Oct. 1, 2020

(86) PCT No.: PCT/IT2020/050241
§ 371 (c)(1),
(2) Date: Apr. 1, 2022

(87) PCT Pub. No.: WO2021/064761
PCT Pub. Date: Apr. 8, 2021

(65) Prior Publication Data
US 2022/0369876 A1    Nov. 24, 2022

(30) Foreign Application Priority Data
Oct. 3, 2019    (IT) .................. 102019000017915

(51) Int. Cl.
*A47L 7/00* (2006.01)
*A47L 7/04* (2006.01)
*A47L 9/18* (2006.01)

(52) U.S. Cl.
CPC .............. *A47L 7/0061* (2013.01); *A47L 7/04* (2013.01); *A47L 9/181* (2013.01); *A47L 9/185* (2013.01)

(58) Field of Classification Search
CPC ........ C02F 2307/12; C02F 1/505; A47K 1/04; A47J 31/60; A47L 7/0061; A47L 7/04;
(Continued)

(56) References Cited

U.S. PATENT DOCUMENTS 7,819,127 B1    10/2010  Huffman
2016/0106283 A1*  4/2016  York ................... A47L 7/0061
                                                    96/243

FOREIGN PATENT DOCUMENTS

EP          1 340 445        9/2003
IT          MI20 091 314     1/2011

OTHER PUBLICATIONS

International Search Report filed in PCT/IT2020/050241 mailed Jan. 21, 2021.

* cited by examiner

*Primary Examiner* — Brian D Keller
*Assistant Examiner* — John C Merino
(74) *Attorney, Agent, or Firm* — RANKIN, HILL & CLARK LLP (57) ABSTRACT

An antibacterial cleaning machine with wet filter includes a container body inside which are disposed at least one motor group for aspirating flows of air and debris from outside; at least one first tank for collecting the debris which contains a first volume of filtering liquid which is arranged along the passage path between the inlet and outlet; at least one internal path of the flows of air and debris that includes an inlet, an outlet, conveying means that have an inlet immersed in the filtering liquid. The tank includes at least one sanitizing element made of silver and/or silver alloy which is positioned immersed in the volume of filtering liquid.

8 Claims, 10 Drawing Sheets

(58) Field of Classification Search
CPC . A47L 9/181; A47L 9/185; A47L 9/16; A61L 9/22; A61L 2208/213; A61L 9/014
See application file for complete search history.

ANTI-BACTERIAL CLEANING MACHINE WITH WET FILTER

FIELD OF THE INVENTION

The invention concerns an antibacterial cleaning machine with wet filter, generally usable to clean and sanitize surfaces and spaces, eliminating not only dirt from them, but also bacteria and pathogen agents.

Background of the Invention

It has been known since ancient times that, in addition to being a so-called noble and substantially rare metal, and for this reason often used as a coin, silver has antibacterial properties, as it is toxic to bacteria, algae and fungi.

In detail, the antibacterial property derives from the fact that the silver ion ($Ag^+$) is able to irreversibly damage the key system of the enzymes in the membrane of the pathogen agents.

For this reason, silver and its compounds have been used for some time both to make food supplements, typically in the form of colloidal silver, and to make filtration devices for machinery and household appliances, and also to make fabric fibers that contain it and that are intrinsically able to develop a constant antibacterial action during their use.

In the specific field of household appliances, and in particular the field of cleaning machines such as vacuum cleaners that operate with a simple suction or in the more complete ones that have devices for the production of steam, silver is used to make filters that typically on the one hand are used to separate the debris from the flows of aspirated air, and on the other hand are also able to sanitize the air flows from bacteria, before they are reintroduced into the environment during the functioning of the vacuum cleaners.

Patent EP1340445, for example, discloses a vacuum cleaner with a wet filter, in this specific case with a water filter, in which a tank is provided in which to contain the water and in which to make the flows of aspirated air bubble, in order to release therein the aspirated debris which is transported.

Two electrodes are provided in the tank, embedded in the water and made with a silver alloy, and which are connected to an electric current power source.

The electric current amplifies the antibacterial effect that occurs during the passage and bubbling in the water of the flows of aspirated air, which subsequently, as stated above, after being purified, is reintroduced into the environment.

Patent KR20050005611 discloses a cyclone vacuum cleaner which has a body made with a resin that incorporates nano-polymers for antimicrobial and deodorant activity.

In detail, the vacuum cleaner comprises a dirt collection unit which, at least in an upper part, is made with a resin based on nano-polymers and which contains silver.

Patent US2016106283 discloses a vacuum cleaner with a water filter that contains an antibacterial and fungicidal particulate.

The filtration device of the vacuum cleaner forces the passage of the aspirated air into the water of the filter in which silver nano-particles are dispersed which, mixing in the air, make it clean and fresh to be returned to the environment.

The state of the art has some disadvantages.

One disadvantage is that in vacuum cleaners with wet filters, in order to obtain an effective antibacterial action it is necessary to provide, in the structure of the vacuum cleaner, a pair of electrodes made of silver, or a silver alloy, intended to be drowned in the liquid that forms the filter itself and powered by an electricity source.

This embodiment is complicated and rather expensive, since it requires the assembly of specific components, in this specific case a power supply unit to activate the antimicrobial action, and the silver or silver alloy electrodes.

Furthermore, due to the presence of water, it is necessary to provide specific watertight connections between the electrodes and the power supply unit.

Another disadvantage is that in order to use the antimicrobial properties of silver without resorting to a power supply with electric sources and to make at least the parts of the vacuum cleaners that are in contact with dirt, such as the collection tanks or filters, it is necessary to use a specific material that intrinsically possesses antibacterial properties, that is, in other words, to use a special material that contains silver or silver alloys.

These materials are considerably more expensive than the typically plastic and cheap materials that are normally used to make vacuum cleaners and household appliances in general and, therefore, this characteristic significantly affects the production costs and the final price of the vacuum cleaners.

Furthermore, the antibacterial action of the silver is affected by the use of the vacuum cleaner and its efficiency significantly decreases over time.

For this reason, it is necessary to periodically replace the electrodes, or the filters or even the entire dirt collection tanks made with special materials.

PURPOSES OF THE INVENTION

The purpose of the invention is to overcome the disadvantages encountered above in the state of the art.

Another purpose of the invention is to provide an antibacterial cleaning machine with a wet filter that supplies a satisfactory and more economical purification and sanitizing action than in the state of the art.

Another purpose of the invention is to provide an antibacterial cleaning machine with a wet filter that does not require the installation and use of electrodes and electric power supply units.

Another purpose of the invention is to provide an antibacterial cleaning machine with a wet filter that can be made with the typical and cheap plastic materials with which these machines are made, that is, without using special materials that contain ions or nano-particles of silver or silver alloys.

Another purpose of the invention is to provide an antibacterial cleaning machine with a wet filter that allows to substantially maintain the antibacterial action constant over time, even in the case of intensive and prolonged use.

According to one aspect of the invention, an antibacterial cleaning machine with a wet filter is provided, in accordance with the characteristics of claim 1.

Further aspects and characteristics of the invention are indicated in the dependent claims.

The invention allows to obtain the following advantages:
- provide an antibacterial and sanitizing action of the air flows that carry the dirt collected in the cleaning machine;
- reintroduce purified and sanitized air into the environment;
- simplify the structure of cleaning machines, in particular those equipped with wet and antibacterial filters;

make cleaning machines more economically advantageous which, in addition to the cleaning action, simultaneously provide an antibacterial action.

BRIEF DESCRIPTION OF THE DRAWINGS

Other characteristics and advantages of the invention will become more apparent from the detailed description of some preferred but not exclusive embodiments of an antibacterial cleaning machine with wet filter, shown as a non-restrictive example in the attached drawings wherein.

DETAILED DESCRIPTION OF A PREFERRED EXAMPLE EMBODIMENT

With reference to the drawings as above, 1 indicates an antibacterial cleaning machine as a whole, hereafter briefly machine 1, with wet filter 2.

Figure 1:
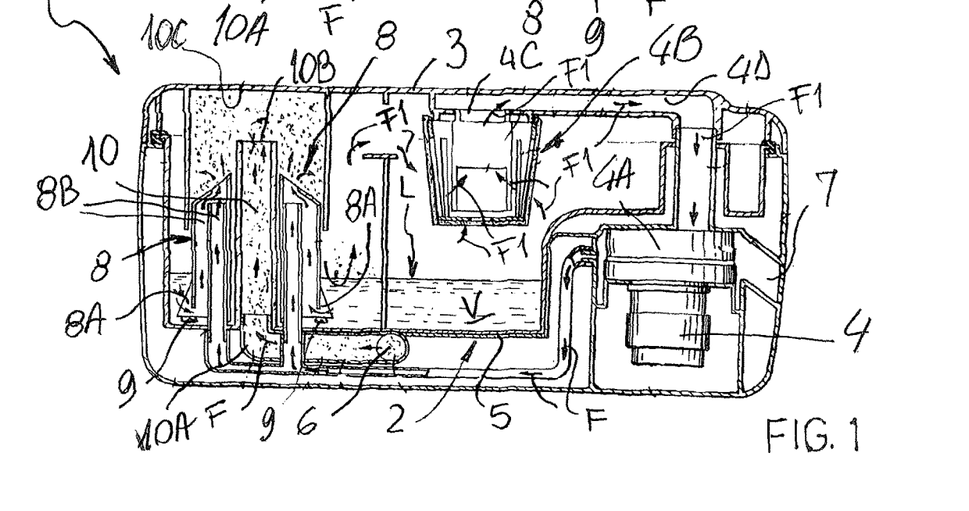
FIG. 1 is a view of a possible structural and transparent diagram of an antibacterial cleaning machine with wet filter.
Figure 2:
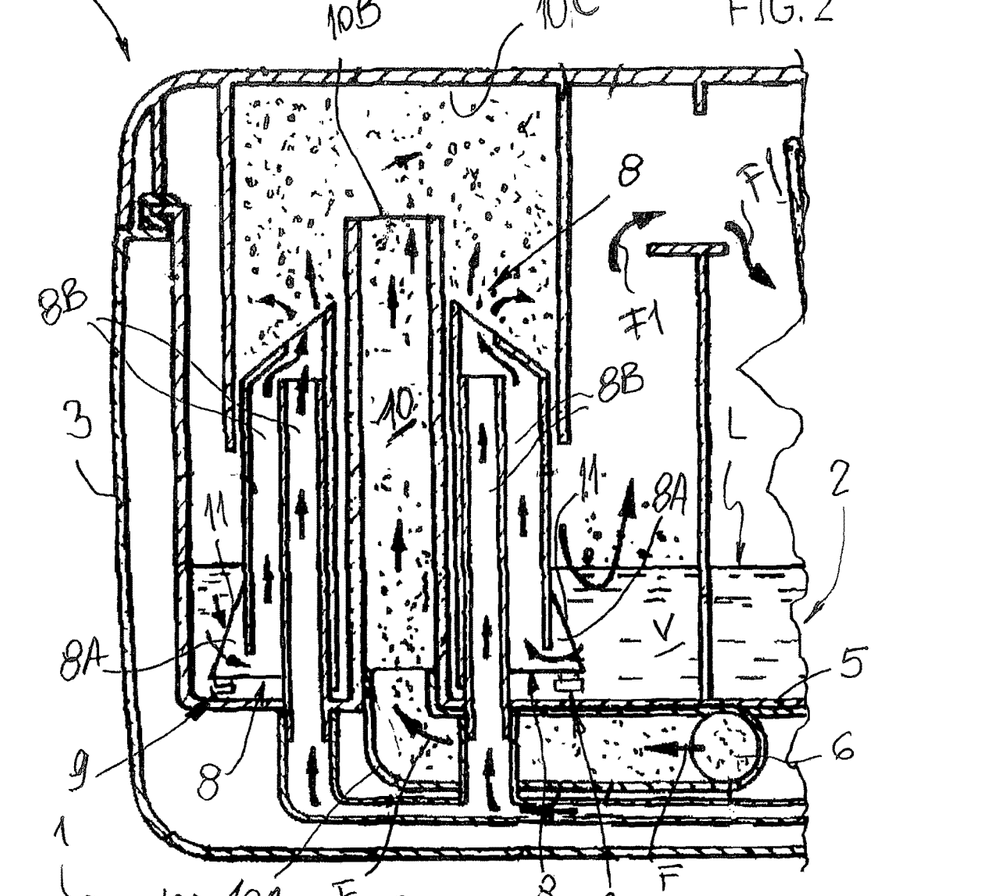
FIG. 2 is an interrupted view on an enlarged scale of a part of the machine of FIG. 1.

The machine 1 comprises a container body 3, typically with a box-like shape and openable, for example equipped with an access aperture closed with a lid, inside which are mounted at least one motor group 4 that aspirates flows F of air with collected debris from the outside, a fan 4A which is driven by the motor group 4, at least one tank 5, conformed as a tub and equipped with a closing lid, in which the debris is collected and which contains a first volume V of filtering liquid that defines a surface level L of the liquid.

An obligatory path is defined inside the body 3 in which the aspirated flows F of air and debris and the flows F1 of air purified from the debris pass, which very briefly comprises an inlet 6, to which the end of a flexible suction pipe is typically connected, an outlet 7 and conveying means 8.

In the first volume V of filtering liquid, in this specific and example case water, there is immersed the lower part of the conveying means 8, that is, that part which faces toward the bottom of the tank 5 and shapes a pair of inlet apertures 8A through which the water enters in order to mix with the aspirated flows F of air and debris.

In the first volume V, the aspirated flows F of air release the debris that they carry in suspension, before they are reintroduced into the environment, indicated with F1 in the drawings, and after having lapped and cooled the motor group 4, conveyed on the latter by the obligatory path.

In the latter, preferably in the upper zone, a floating device 4B can also be housed which controls the opening or closing of a gap 4C which introduces the flows F1 of purified and sanitized air into a conveying duct 4D toward the motor group 4.

At least one sanitizing element 9 is mounted in the tank 5 which is made of silver/silver alloy, which therefore remains constantly and, preferably, but not exclusively, completely immersed in the first volume V of water, preventing the latter from decaying even if stagnant in the tank 5 for a long time.

The sanitizing element 9 is made as a three-dimensional element and has, preferably but not exclusively, the shape of a ring-shaped body, defined below, for short, as ring 9 or also ring-shaped body 9.

With reference to FIGS. 3-6, the structure of the lower part of the conveying means 8 can be seen in detail.

As can be seen, this lower part comprises a pair of appendages 11 which enclose a central duct 10 between them in a specular manner, forming a substantially single body with it.

The appendages 11 have the respective lower ends 12 with an enlarged shape and both facing toward the bottom of the tank 5.

As can be seen in the drawings, the external surfaces of these appendages 11 are advantageously perforated with through holes 13 made in rows and columns, through which the water passes before it is added to the aspirated flows F of air and debris and directed toward the upper end 10B of the duct 10.

In a preferred embodiment, the conveying means 8 are shaped so as to provide a known Venturi effect, which draws water from the tank 5, sends it into ducts 8B parallel to the central duct 10 to the outlet 10B from which it nebulizes it in order to better combine with the aspirated flows F of air containing the suspended debris.

The apertures 8A of the lower ends 12 are equipped with respective transverse flat closing sections 15 which are also perforated and which shape respective hollow profiles 14 to be coupled precisely and opposite each other with the external surface of the duct 10 in the mounted configuration.

The duct 10 has one end 10A considered as lower, that is, it is opposite the upper end 10B, which is connected with the inlet 6, while the upper end 10B is free and flows, together with the ducts 8B, into a bell 10C, inside which merge both the aspirated flows F of air containing the debris and also the water nebulized by the Venturi effect and which, by mixing with the debris thanks to the swirling motion created inside the bell 10C, makes them heavier, causing them to fall by gravity into the first volume V of filtering liquid.

The flows F1 of air purified from debris and sanitized are conveyed toward the gap 4C and the conveying duct 4D.

The means for fixing the ring-shaped bodies 9 in correspondence with the respective apertures 8A of the appendages 11 can have at least two embodiments.

Figure 3A:
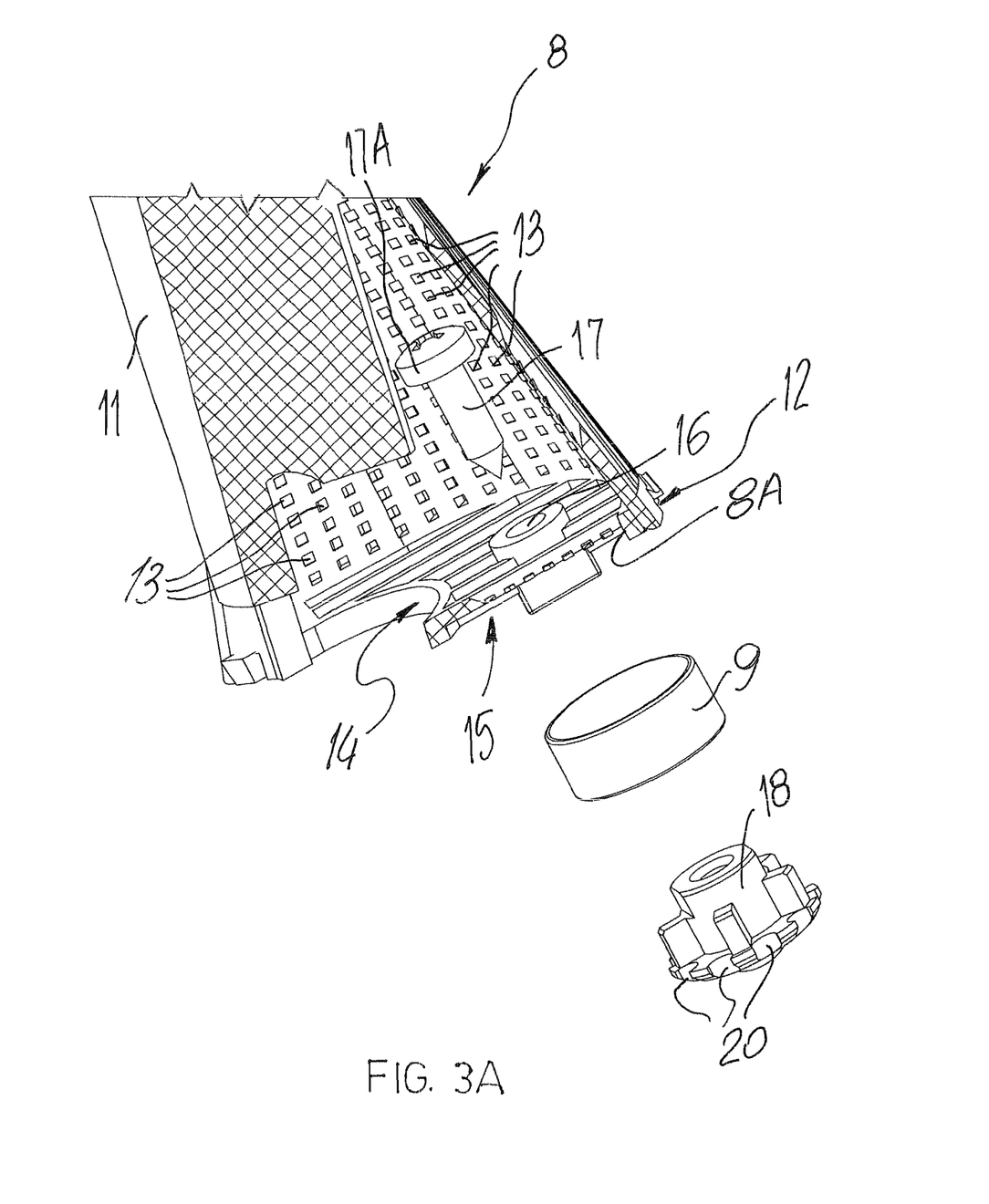
FIGS. 3A and 3B are schematic and exploded views of an appendage of the machine of FIG. 1 and of the components of a sanitizing element.
Figure 3B:
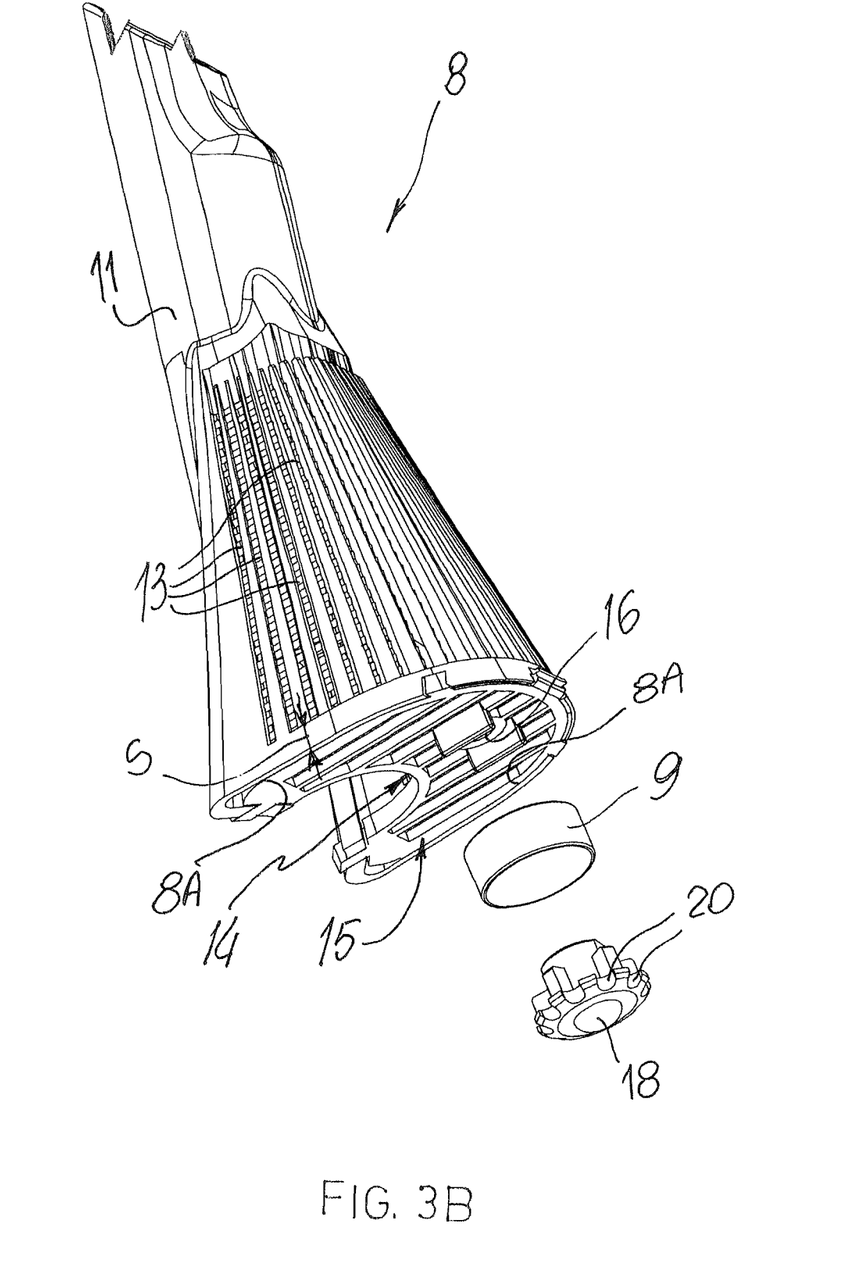

According to a first embodiment, in each of the cross-sections 15 there is made at least one through aperture 16 in which a respective bolt 17 is engaged, the shank of which has a sufficient length to completely pass through the thickness S of the cross-section 15, extending beyond this toward the outside and onto which a tightening knob 18 can be screwed.

The head 17A of the bolt 17 rests on the boundary of the through aperture 16 and the ring-shaped body 9 can be tightened between the knob 18 and the cross-section 15.

The knob 18 has a perimeter in which a plurality of cavities 20 is made in the radial direction through which, when the knob 18 is screwed onto the bolt 17 and presses on the ring-shaped body 9, the water and the flows F of air can pass and lap the ring-shaped body 9 becoming charged with silver ions (Ag$^+$) before completing the path that takes them outside the container body 3, advantageously purified of debris, bacteria and pathogens.

Figure 4A:
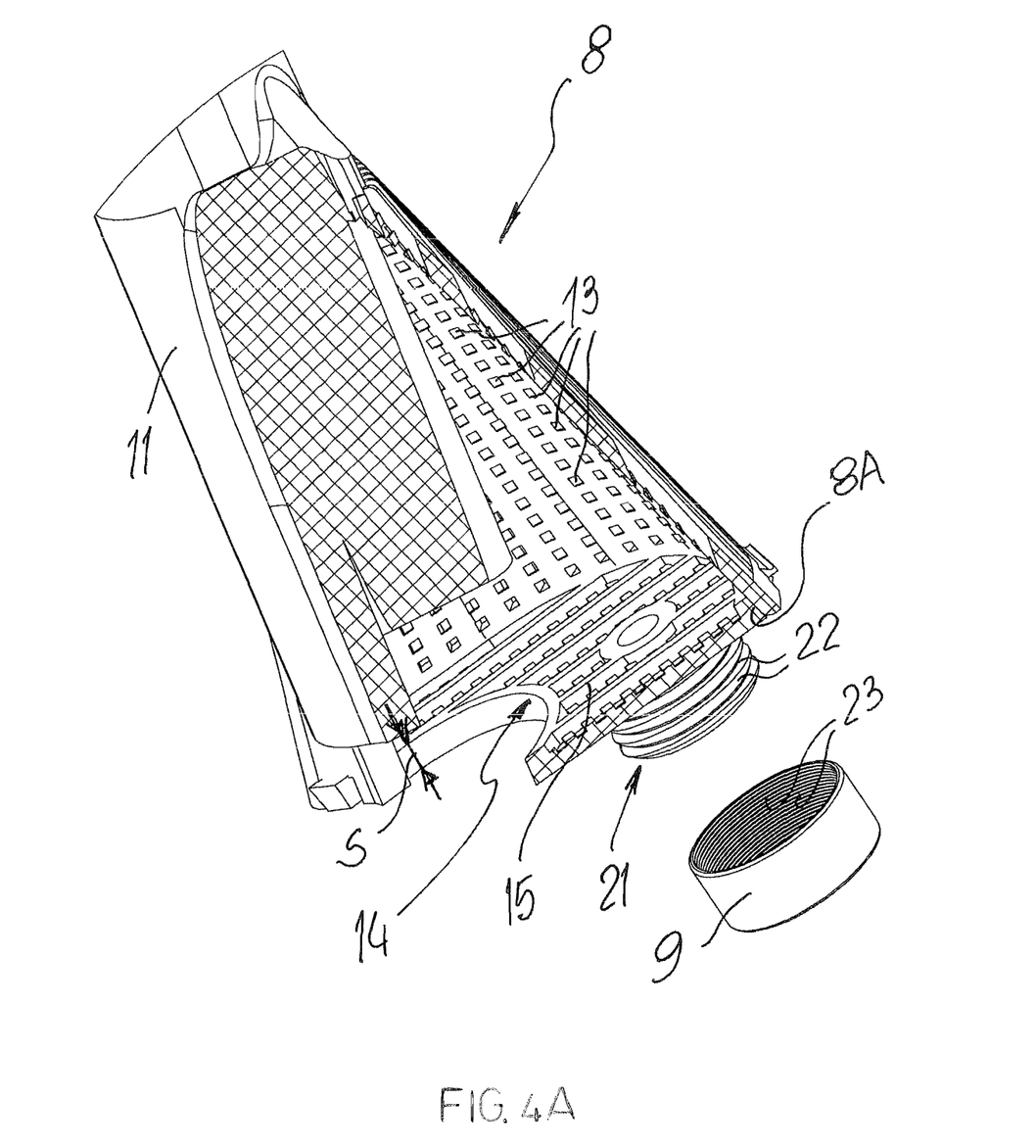
FIGS. 4A and 4B are schematic and exploded views of the appendage of FIGS. 3A and 3B with a different embodiment of the components of a sanitizing element.
Figure 4B:
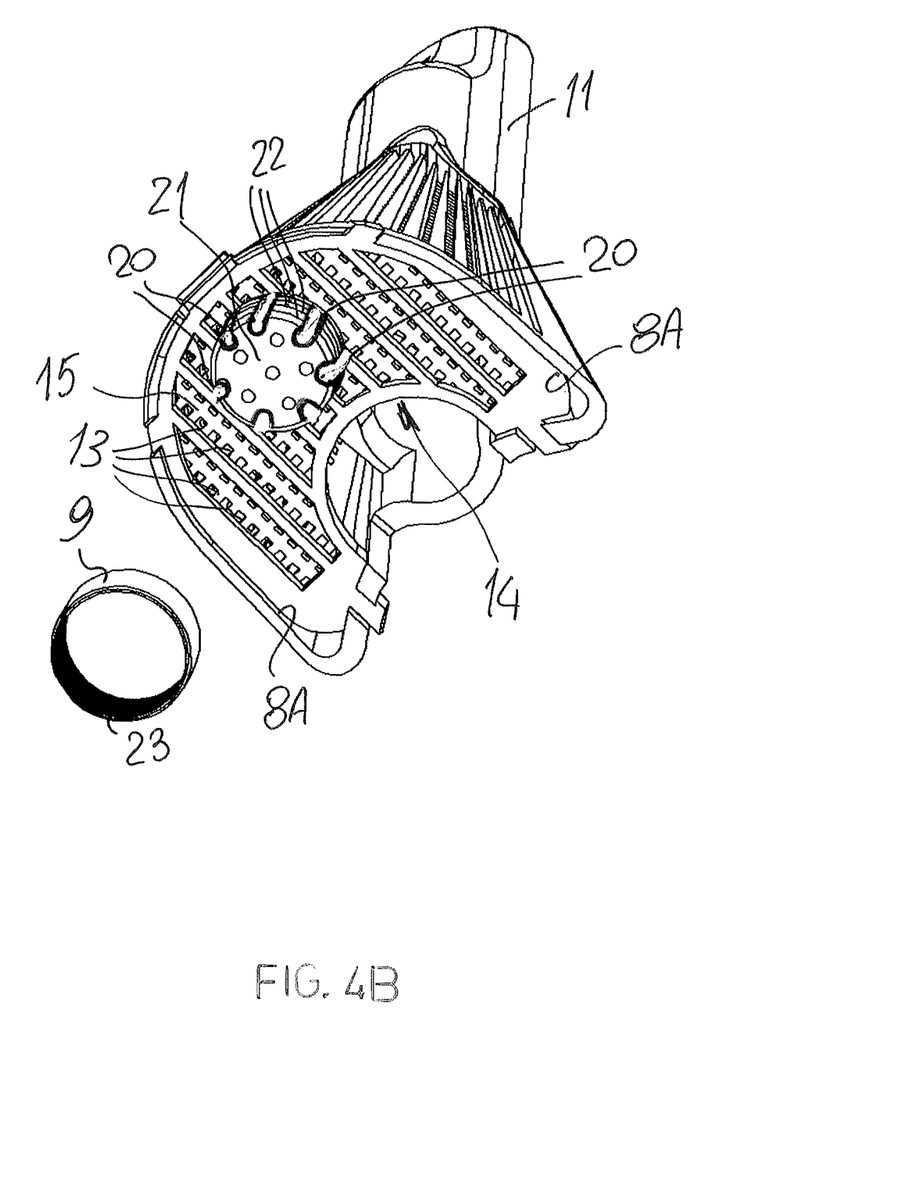
Figure 5:
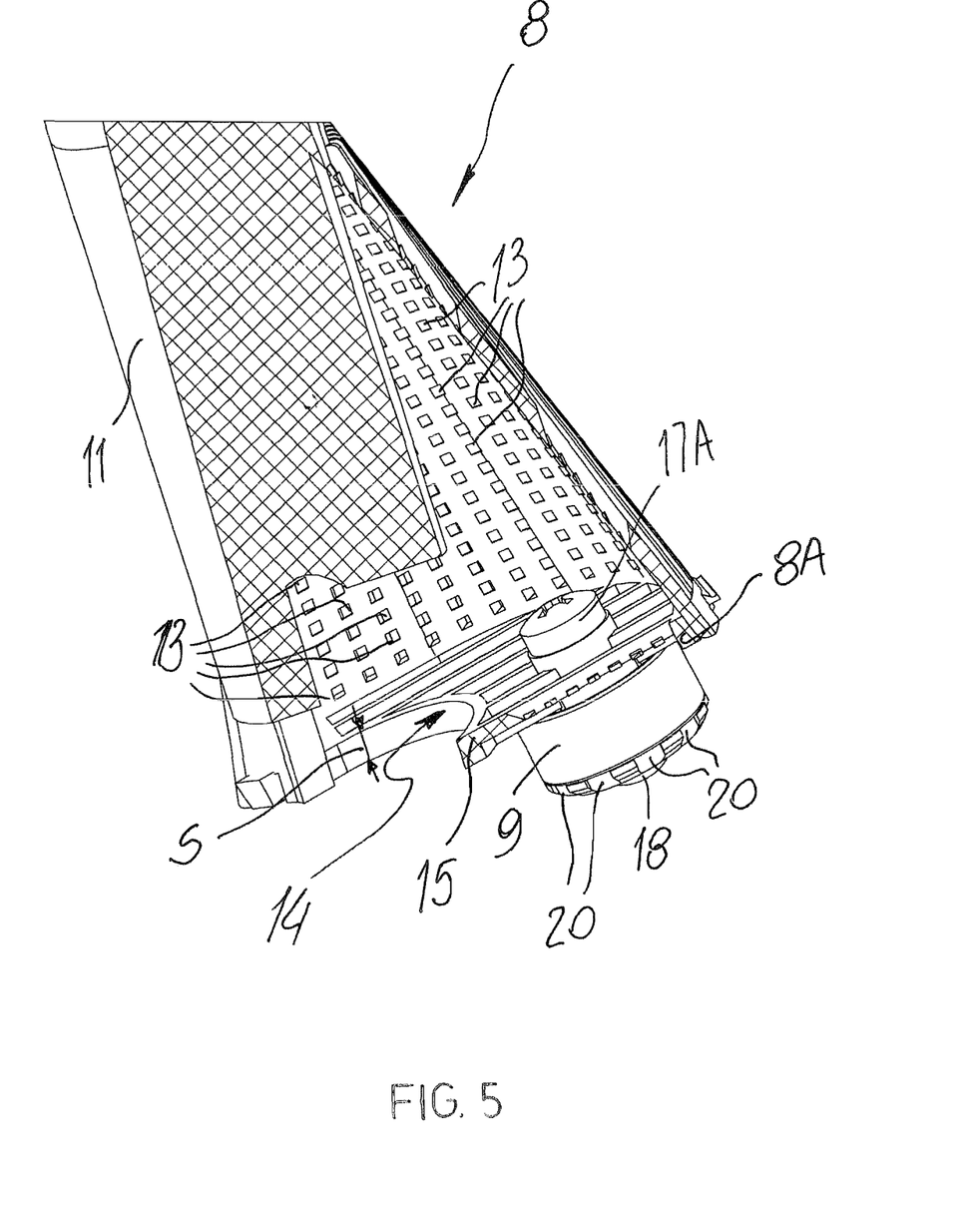
FIG. 5 shows the appendage of FIGS. 3A and 3B in detail, in a mounted configuration of a sanitizing element.
Figure 6:
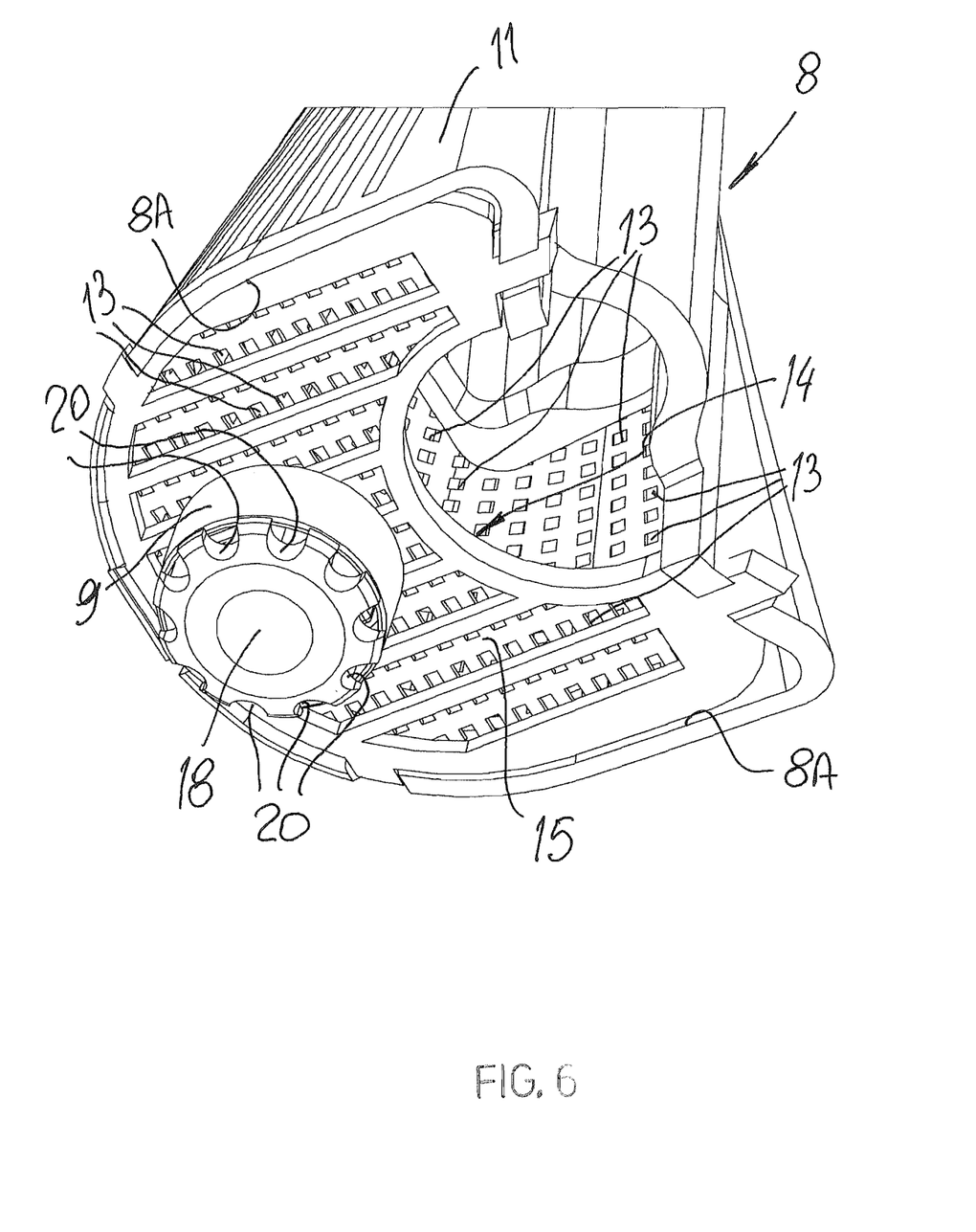
FIG. 6 is an interrupted bottom view of the appendage of FIG. 5.
Figure 7:
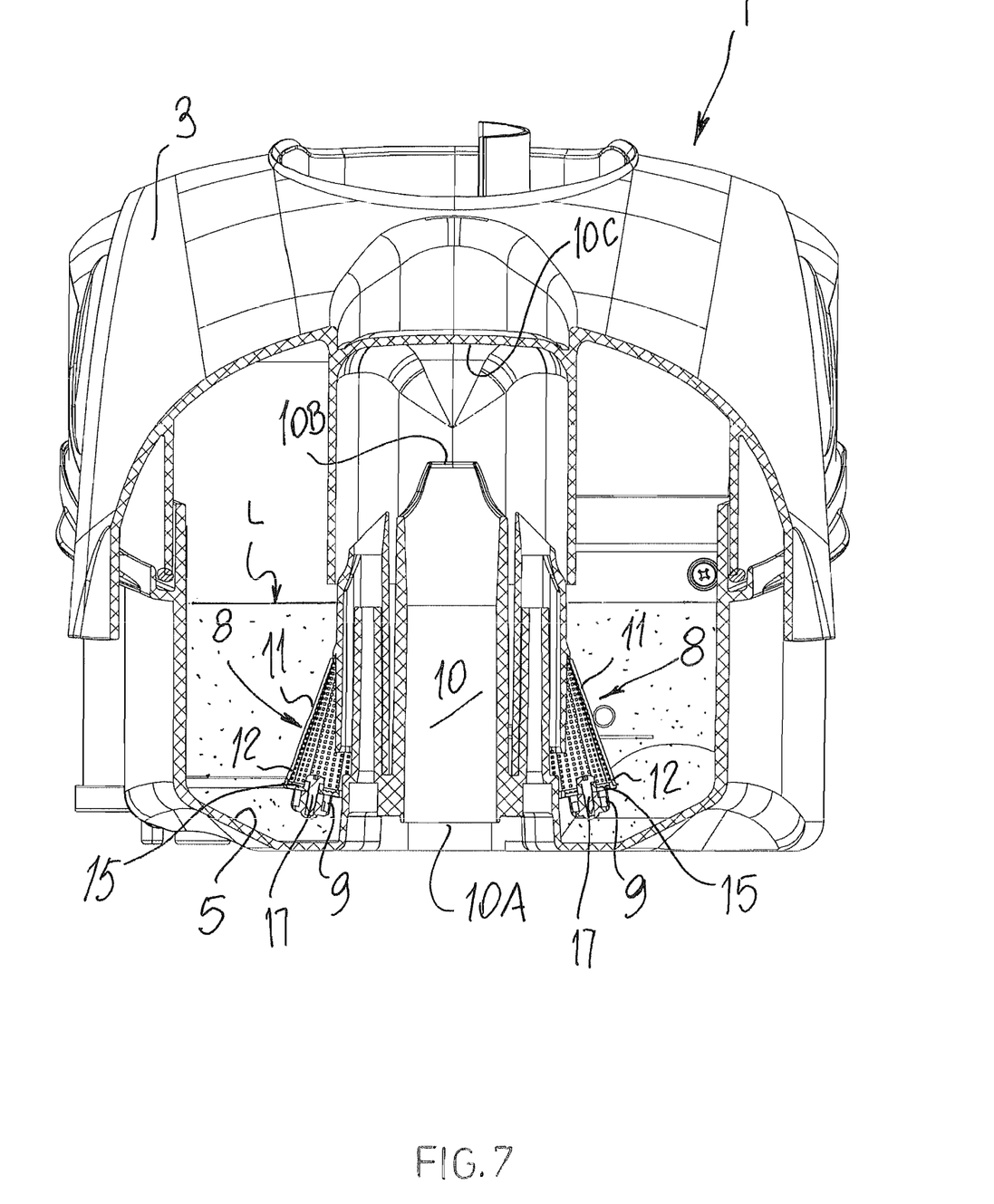
FIG. 7 is a schematic, partly open, front view of the antibacterial cleaning machine with wet filter of FIG. 1.

The second embodiment of the means for fixing the ring-shaped body 9 to the respective cross-section 15 provides in each of these a tang 21 which extends toward the bottom of the tank 5 and which is externally equipped with a helical thread 22.

In this case, the inside of the ring-shaped body 9 is correspondingly equipped with a counter-thread 23 which can be engaged with the thread 22 and which allows the ring-shaped body 9 to be screwed and fixed directly onto the tang 21, or unscrewed and removed therefrom.

The person of skill will understand that in this second embodiment of the fixing means, the grooves 20 can also be made directly on each tang 21, despite the presence of the thread 22 which, in this case, will have a generatrix that is discontinuous and spaced out by the grooves 20.

It must be emphasized that the use of the sanitizing element can also be provided in the tanks that contain water of more complex cleaning machines that use sources and jets of steam for their functioning: also in this case, the presence of the sanitizing element, both in the form of a ring-shaped body 9 and also in another three-dimensional form required by the assembly requirements, kept completely (or even only partly) immersed in the water, prevents it from decaying and the consequent proliferation of bacteria and pathogens.

Figure 8:
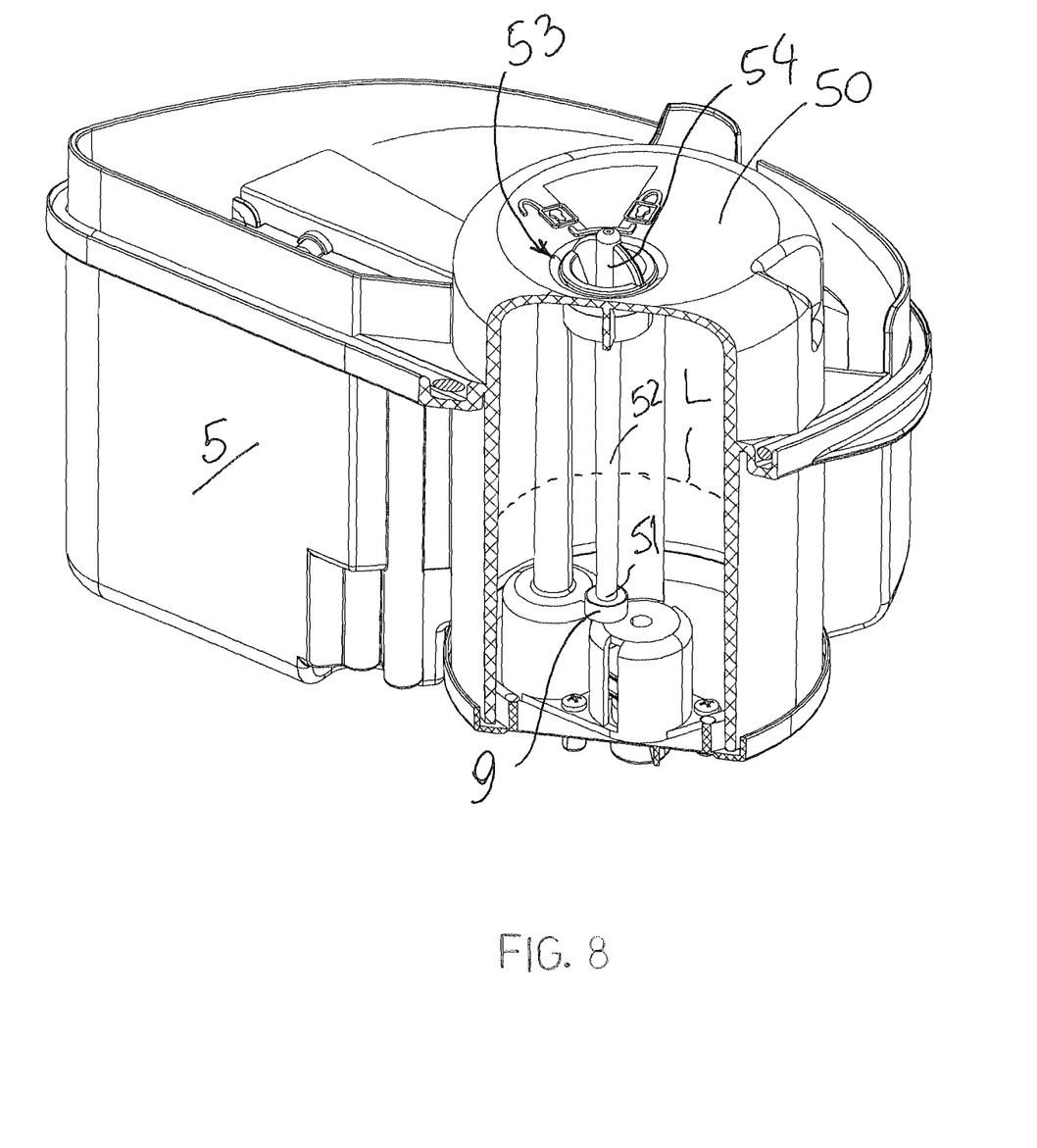
FIG. 8 is a schematic view of a second possible version of the antibacterial cleaning machine with wet filter.

With reference to FIG. 8, a possible alternative embodiment of the machine 1 can be seen which, in this case, is equipped with an additional tank to the tank 5 and indicated with 50, but which is separate therefrom.

In this second tank 50, there is loaded a second volume V of water which, however, is not intended for the filtration of the aspirated flows F of air and debris, but is typically provided to feed a steam production device (not shown, since it is known to the person of skill in the art) which can be associated with the machine 1, for example in order to feed steam to a household appliance such as an additional iron which can be connected in a known manner to the steam production device of the machine 1 which, in this case, also performs the function of source of steam for treating garments and linen.

Figure 9:
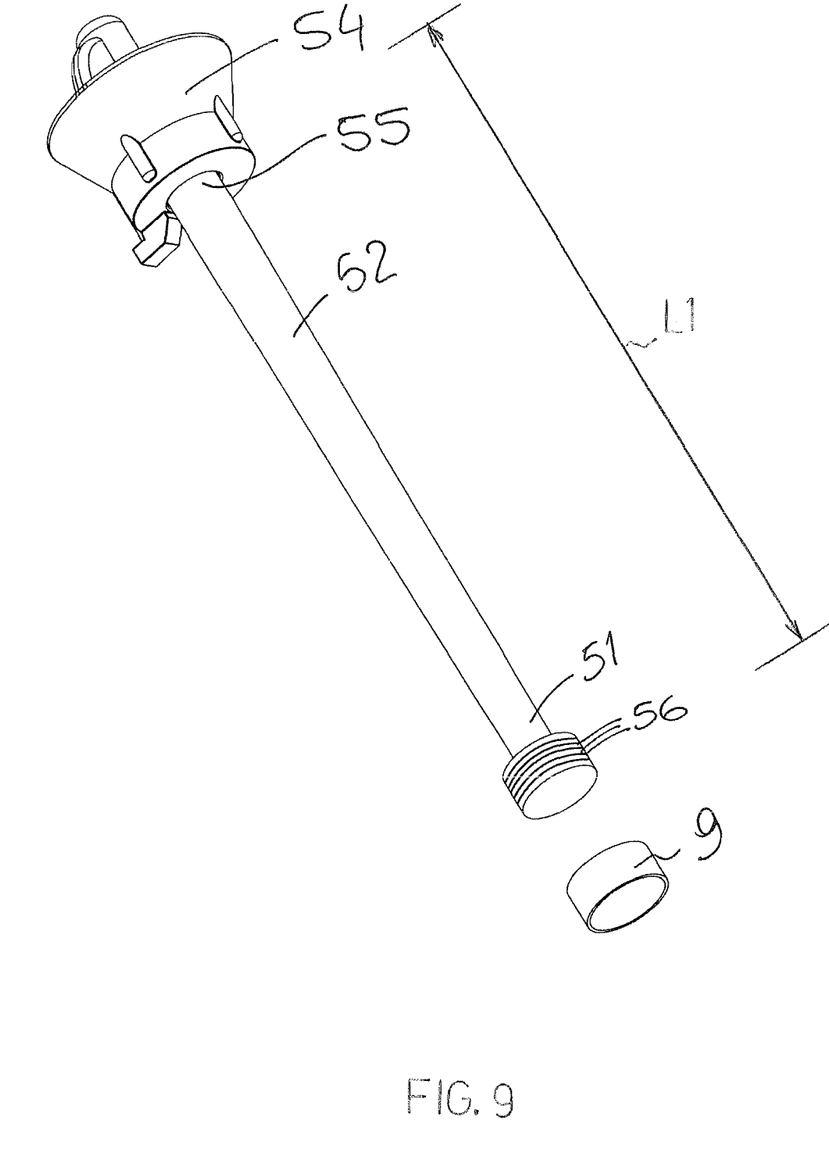
FIG. 9 shows a detail of FIG. 8 on an enlarged scale and in perspective.

In this alternative embodiment, the ring-shaped body 9 can be located at a lower end 51 of a support stem 52, visible in detail in FIG. 9, which is inserted inside the tank 50, passing through a suitable aperture 53 provided in the ceiling thereof.

The aperture 53 is advantageously equipped with means for clamping or unclamping the stem 52, useful both for fixing it in a position of use inside the tank 50, and also for extracting it therefrom when necessary, for example in order to carry out its normal maintenance or to replace the ring-shaped body 9 when it is deteriorated and spent.

The length of the stem 52, indicated with L1 in FIG. 9, is provided such as to keep, also in this case, the ring-shaped body 9 constantly immersed below the level L of the second volume V of water, in order to constantly release silver ions (Ag$^+$) therein.

The means for clamping or unclamping the stem 52 can comprise a thread obtained on the internal boundary of the aperture 53 with which a cap 54 can be engaged which has a perimetral counter-thread and which is fixed to the end of the stem 52 opposite the end 51, indicated with 55 in FIG. 9.

In order to fix the ring-shaped body 9 to the end 51, the latter can be equipped with an external thread 56 of its own on which a counter-thread made inside the ring-shaped body 9 is engageable.

The person of skill will understand that other fixing means are also possible, such as, as a non-limiting example, a simple pressure coupling of the ring-shaped body 9 onto the end 51 of the stem 52.

It must be emphasized that, in general, the tank 5 and/or the second tank 50, equipped with the sanitizing element, that is, with the ring-shaped body 9, can be mounted individually or combined with each other in any cleaning machine whatsoever that is equipped with a wet filter, that is, a water filter.

Furthermore, both the first tank 5 and also the second tank 50 can also be mounted in household appliances which are equipped with steam production, both in order to carry out very thorough cleaning operations, and also domestic and industrial activities other than cleaning.

In all cases, the volumes V of water used are always kept in an antibacterial and sanitized condition by the presence of sanitizing elements made of silver or silver alloys that prevent their putrefaction, preventing the formation and proliferation of pathogens therein.

The tank 5 or the second tank 50 equipped with one or more ring-shaped bodies 9 can also be mounted in other types of machines, such as, for example, machines that use volumes V of water for the production of beverages, in particular hot beverages, known as "espresso" machines, to prevent the putrescence of the water contained in them if the machines are not used particularly often.

The functioning of the antibacterial cleaning machine with wet filter according to the invention is described below.

When it is necessary to carry out cleaning work in a space, a user activates the machine 1 in a known manner, starting the motor group 4 which activates the fan 4A which generates the suction action.

The aspirated flows F of air that contains suspended debris enter through the inlet 6 and the flexible tube usually connected thereto.

The flows F of air and debris are sent toward the conveying means 8, in particular through the central duct 10 which conveys them toward its upper end 10B until they expand inside the bell 10C.

The flows of water withdrawn from the tank 5 also arrive, through the parallel ducts 8B, into the bell 10C, said water is sucked into the bell 10C due to the Venturi effect arriving inside it in nebulized form, so as to better mix with the flows F of air and, above all, with the debris that is suspended therein.

The mixing of the nebulized water with the debris weighs the latter down causing it to fall by gravity into the volume V of water contained in the tank 5, while the flows F1 of purified and sanitized air pass through the gap 4C and from this into the conveying duct 4D toward the motor group 4, in order to cool it, and subsequently toward the outlet 7, in order to be reintroduced into the environment.

The sanitizing elements, that is, the silver ring-shaped bodies 9, are constantly immersed in the volume V of water contained in the tank 5, the sanitizing elements constantly releasing ions (Ag$^+$) into the tank 5 which carry out the bactericidal action and the action of eliminating pathogenic elements, which prevent the water from decaying and which are carried into the bell 4C combining with the flows F of air coming from the outside, sanitizing it.

In detail, the water is suctioned from the tank 5 due to the Venturi effect and passes through the rows and columns of holes 13 of the appendages 11 and sections 15.

During its movement, the suctioned water also passes through the cavities 20 which are made in the perimeter of the tightening knob 18, or in the tang 21, becoming caught between them and the respective ring-shaped bodies 9 which, as stated, release the ions (Ag$^+$) into the water, giving it the antibacterial and anti-pathogenic capacity that is also transmitted to the flows F1 of air.

In order to keep the bactericidal action and the action of eliminating pathogenic elements constant, it is possible to periodically replace the ring-shaped bodies 9.

In order to perform this operation, a user, after having opened the container body 3 in order to access its interior, removes the ring-shaped bodies 9 and replaces them with new ones.

The replacement of the ring-shaped bodies 9 occurs, in the first embodiment of the fixing means, by unscrewing the knobs 18 from the bolts 17 and releasing the now spent ring-shaped bodies 9 which are eliminated and replaced with new ring-shaped bodies 9 fixed to the respective appendages 11 by screwing the knobs 18 back onto their respective bolts 17.

In the second embodiment of the fixing means, the replacement of the ring-shaped bodies 9 occurs by simply unscrewing the spent ones and subsequently screwing two other new ones.

In the second version of the machine 1, the ring-shaped body 9, since it is fixed to the lower end of the stem 52, in the position of use of the latter remains constantly immersed in the second volume V of water, releasing silver ions (Ag$^+$) into it.

When a ring-shaped body 9 is no longer able to release these ions, by unscrewing the cap 54 the stem 52 is extracted and the spent ring-shaped body 9 is replaced with a new ring-shaped body 9, and the stem 52 is repositioned inside the second tank 50, clamping it by screwing the cap 54 into the aperture 53.

In practice it has been verified that the invention achieves the intended purposes.

The invention as conceived is susceptible to modifications and variants, all of which are within the scope of the inventive concept.

Furthermore, all the details can be replaced with other technically equivalent elements.

In their practical embodiment, any other materials, as well as shapes and sizes, can be used according to requirements, without departing from the main field of protection of the following claims.

The invention claimed is:

1. An antibacterial cleaning machine with wet filter that comprises a container body inside which are disposed:
    at least one motor group for aspirating flows of air and debris from outside;
    at least one internal path of the flows of air and debris that comprises an inlet, an outlet, and conveying means;
    at least one first tank which contains a first volume of liquid in which said conveying means are at least partly immersed, said first tank being arranged along a passage path between said inlet and outlet;
    wherein said first tank includes at least one sanitizing element comprising at least one ring-shaped three-dimensional body made of silver or silver alloy which is positioned immersed in said first volume of liquid,
    wherein the sanitizing element is removably fixed by removable fixing means including:
    a bolt passing through said conveying means and on the shank of which said ring-shaped three-dimensional body is engaged, and
    a tightening knob which is screwed onto said bolt to contrast said ring-shaped three-dimensional body.

2. The machine as in claim 1, wherein said at least one sanitizing element is removably fixed in said passage path with said removable fixing means.

3. The machine as in claim 1, wherein said at least one sanitizing element is mounted in correspondence with an inlet opening of said conveying means.

4. The machine as in claim 1, wherein said tightening knob shapes cavities for the passage of flows of aspirated air defined between said ring-shaped body and said tightening knob.

5. The machine as in claim 1, wherein said inlet of said conveying means comprises an aperture in which a grid element is mounted transversely.

6. The machine as in claim 1, further comprising:
    a steam generating means;
    means of ejection of steam jets;
    a second tank for containing a second volume of water, separated from said first volume, and provided with heating means, wherein said second tank comprising at least one second sanitizing element kept immersed in said second volume of water.

7. The machine as in claim 6, wherein said removable fixing means comprising:
    a stem which has one end provided with coupling means for coupling with said at least one second sanitizing element and an opposite end provided with a cap;
    an aperture obtained in said second tank in which said cap can be engaged in a removable manner, so that said at least one second sanitizing element is constantly immersed in said second volume of water.

8. An antibacterial cleaning machine with wet filter that comprises a container body inside which are disposed:
    at least one motor group for aspirating flows of air and debris from the outside;
    at least one internal path of the flows of air and debris that comprises an inlet, an outlet, conveying means;
    at least one first tank which contains a first volume of liquid in which said conveying means are at least partly immersed, said first tank being arranged along a passage path between said inlet and outlet;
    wherein said first tank includes at least one sanitizing element comprising at least one ring-shaped three-dimensional body made of silver or silver alloy which is positioned immersed in said first volume of liquid, and
    wherein the sanitizing element is removably fixed by removable fixing means including:
    a tang which extends from said inlet of said conveying means and is provided with a thread;
    a counter-thread formed in said ring-shaped three-dimensional body and engageable with said thread of said tang.

* * * * *